(12) United States Patent  (10) Patent No.: US 7,834,530 B2
Manohara et al.  (45) Date of Patent: Nov. 16, 2010

(54) CARBON NANOTUBE HIGH-CURRENT-DENSITY FIELD EMITTERS

(75) Inventors: Harish M. Manohara, Arcadia, CA (US); Michael J. Bronikowski, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 1123 days.

(21) Appl. No.: 11/137,725

(22) Filed: May 24, 2005

(65) Prior Publication Data

US 2006/0066202 A1  Mar. 30, 2006

Related U.S. Application Data

(60) Provisional application No. 60/575,043, filed on May 27, 2004.

(51) Int. Cl.
 *H01J 9/02* (2006.01)
(52) U.S. Cl. ........................................ 313/310; 977/789
(58) Field of Classification Search ......... 313/309–311, 313/351, 346 R, 336; 977/789, 163; 427/258, 427/249.1
See application file for complete search history.

(56) References Cited

U.S. PATENT DOCUMENTS

| | | | |
|---|---|---|---|
| 6,221,154 B1 | 4/2001 | Lee et al. | |
| 6,232,706 B1 * | 5/2001 | Dai et al. | 313/309 |
| 6,239,547 B1 | 5/2001 | Uemura et al. | |
| 6,250,984 B1 | 6/2001 | Jin et al. | |
| 6,283,812 B1 | 9/2001 | Jin et al. | |
| 6,297,592 B1 | 10/2001 | Goren et al. | |
| 6,339,281 B2 | 1/2002 | Lee et al. | |
| 6,350,488 B1 | 2/2002 | Lee et al. | |
| 6,409,567 B1 | 6/2002 | Amey, Jr. et al. | |
| 6,414,444 B2 | 7/2002 | Fox et al. | |
| 6,440,761 B1 | 8/2002 | Choi | |
| 6,440,763 B1 | 8/2002 | Hsu | |
| 6,448,701 B1 | 9/2002 | Hsu | |
| 6,465,132 B1 | 10/2002 | Jin | |
| 6,472,802 B1 | 10/2002 | Choi et al. | |
| 6,504,292 B1 | 1/2003 | Choi et al. | |
| 6,507,146 B2 | 1/2003 | Moore | |
| 6,514,113 B1 | 2/2003 | Lee et al. | |
| 6,531,828 B2 | 3/2003 | Yaniv et al. | |
| 6,616,497 B1 | 9/2003 | Choi et al. | |

(Continued)

OTHER PUBLICATIONS

Merkulov et al., "Scanned-Probe Field-Emission Studies of Vertically Aligned Carbon Nanofibers", Journal of Applied Physics, Feb. 1, 2001, vol. 89, No. 3, pp. 1933-1937.

(Continued)

*Primary Examiner*—Peter Macchiarolo
(74) *Attorney, Agent, or Firm*—Christie, Parker & Hale, LLP (57) ABSTRACT

High-current density field emission sources using arrays of nanofeatures bundles and methods of manufacturing such field emission sources are provided. Variable field emission performance is provided with the variance in the bundle diameter and the inter-bundle spacing, and optimal geometries for the lithographically patterned arrays were determined. Arrays of 1-μm and 2-μm diameter multi-walled carbon nanotube bundles spaced 5 μm apart (edge-to-edge spacing) were identified as the most optimum combination, routinely producing 1.5 to 1.8 A/cm$^2$ at low electric fields of approximately 4 V/μm, rising to >6 A/cm$^2$ at 20 V/μm over a ~100-μm-diameter area.

9 Claims, 7 Drawing Sheets

U.S. PATENT DOCUMENTS

| | | | |
|---|---|---|---|
| 6,630,772 B1 | 10/2003 | Bower et al. | |
| 6,645,028 B1 | 11/2003 | Dean et al. | |
| 6,648,711 B1 | 11/2003 | Jang et al. | |
| 6,648,712 B2 | 11/2003 | Choi et al. | |
| 6,664,728 B2 | 12/2003 | Pavlovsky et al. | |
| 6,667,572 B2 | 12/2003 | Lewis | |
| 6,699,642 B2 | 3/2004 | Chung et al. | |
| 6,700,454 B2 | 3/2004 | Yaniv et al. | |
| 6,706,402 B2 | 3/2004 | Rueckes et al. | |
| 6,722,936 B2 | 4/2004 | Hammel | |
| 6,739,932 B2 * | 5/2004 | Yaniv et al. | 445/24 |
| 6,764,874 B1 | 7/2004 | Zhang et al. | |
| 6,770,497 B2 | 8/2004 | Ihm | |
| 6,787,122 B2 | 9/2004 | Zhou | |
| 6,790,425 B1 | 9/2004 | Smalley et al. | |
| 6,803,708 B2 | 10/2004 | Simon et al. | |
| 6,835,591 B2 | 12/2004 | Rueckes et al. | |
| 6,836,066 B1 | 12/2004 | Lee et al. | |
| 6,864,162 B2 | 3/2005 | Jin | |
| 6,882,094 B2 | 4/2005 | Dimitrijevic et al. | |
| 6,885,010 B1 | 4/2005 | Traynor et al. | |
| 6,890,230 B2 | 5/2005 | Trujillo et al. | |
| 6,890,505 B2 | 5/2005 | Miyazawa et al. | |
| 6,891,319 B2 | 5/2005 | Dean et al. | |
| 6,899,854 B2 | 5/2005 | Darty | |
| 6,900,580 B2 | 5/2005 | Dai et al. | |
| 6,903,500 B2 | 6/2005 | Jeong et al. | |
| 6,911,767 B2 | 6/2005 | Takai | |
| 6,917,156 B2 | 7/2005 | Moore | |
| 6,923,946 B2 | 8/2005 | Geohegan et al. | |
| 6,942,921 B2 | 9/2005 | Rueckes et al. | |
| 6,969,536 B1 | 11/2005 | Tuck et al. | |
| 6,969,690 B2 | 11/2005 | Zhou et al. | |
| 6,982,519 B2 | 1/2006 | Guillorn et al. | |
| 7,005,807 B1 | 2/2006 | Ha et al. | |
| 7,012,362 B2 | 3/2006 | Kawate et al. | |
| 7,014,737 B2 | 3/2006 | Harutyunyan et al. | |
| 7,014,743 B2 | 3/2006 | Zhou et al. | |
| 7,034,444 B2 | 4/2006 | Tsukamoto | |
| 7,044,822 B2 | 5/2006 | Lee et al. | |
| 7,056,455 B2 | 6/2006 | Matyjaszewski et al. | |
| 7,056,753 B2 | 6/2006 | Lee et al. | |
| 7,115,013 B2 * | 10/2006 | Liu et al. | 445/50 |
| 7,465,494 B2 * | 12/2008 | Ren et al. | 428/367 |
| 7,479,590 B1 * | 1/2009 | Kuczynski | 428/545 |
| 2002/0185949 A1 * | 12/2002 | Yaniv et al. | 313/309 |
| 2003/0185985 A1 * | 10/2003 | Bronikowski et al. | 427/258 |
| 2004/0018371 A1 * | 1/2004 | Mao | 428/545 |
| 2007/0261140 A1 * | 11/2007 | Liang | 977/876 |
| 2007/0284986 A1 * | 12/2007 | Tai et al. | 313/309 |
| 2008/0248235 A1 * | 10/2008 | Feng et al. | 428/113 |

OTHER PUBLICATIONS

Chen et al., "Plasma-Induced Low-Temperature Growth of Graphitic Nanofibers on Nickel Substrates", Journal of Crystal Growth, 1998, vol. 193, pp. 342-346.

Choi et al., "Growth of Carbon Nanotubes by Microwave Plasma-Enhanced Chemical Vapor Deposition at Low Temperature", J. Vac. Sci Technol. A, Jul./Aug. 2000, vol. 18, No. 4, pp. 1864-1868.

Chhowalla et al., "Field Emission From Short and Stubby Vertically Aligned Carbon Nanotubes", Applied Physics Letters, Sep. 24, 2001, vol. 79, No. 13, pp. 2079-2081.

Fan et al., "Self-Oriented Regular Arrays of Carbon Nanotubes and Their Field Emission Properties", Science, Jan. 22, 1999, vol., 283, pp. 512-514.

Guillorn et al., "Operation of Individual Integrally Gated Carbon Nanotube Field Emitter Cells", Applied Physics Letters, Oct. 7, 2002, vol. 81, No. 15, pp. 2860-2862.

Jo et al., "Effect of Length and Spacing of Vertically Aligned Carbon Nanotubes on Field Emission Properties", Applied Physics Letters, May 19, 2003, vol. 82, No. 20, pp. 3520-3522.

Lee et al., "Low-Temperature Growth of Carbon Nanotubes by Thermal Chemical Vapor Deposition Using Pd, Dr, and Pt as Co-Catalyst", Chemical Physics Letters, Sep. 15, 2000, vol. 327, pp. 277-283.

Li et al., "Carbon Nanotube Films Prepared by Thermal Chemical Vapor Deposition At Low Temperature for Field Emission Applications", Applied Physics Letters, Sep. 10, 2001, vol. 79, No. 11, pp. 1670-1672.

Manohara et al., "Field Emission Testing of Carbon Nanotubes for the THz Frequency Vacuum Micro-Tube Sources", Reliability, Testing, and Characterization of MEMS/MOEMS III, Proceedings of SPIE, 2004, vol. 5343, pp. 227-234.

Murakami et al., "Field Emission from Well-Aligned, Patterned, Carbon Nanotube Emitters", Applied Physics Letters, Mar. 27, 2000, vol. 76, No. 13, pp. 1776-1778.

Nilsson et al., "Scanning Field Emission from Patterned Carbon Nanotube Films", Applied Physics Letters, Apr. 10, 2000, vol. 76, No. 15, pp. 2071-2073.

Rao et al., "In Situ-Grown Carbon Nanotube Array with Excellent Field Emission Characteristics", Applied Physics Letters, Jun. 19, 2000, vol. 76, No. 25, pp. 3813-3815.

Semet et al., "Field Electron Emission from Individual Carbon Nanotubes of a Vertically Aligned Array", Applied Physics Letters, Jul. 8, 2002, vol. 81, No. 2, pp. 343-345.

Sohn et al., "Patterned Selective Growth of Carbon Nanotubes and Large Field Emission from Vertically Well-Aligned Carbon Nanotube Field Emitter Arrays", Applied Physics Letters, Feb. 12, 2001, vol. 78, No. 7, pp. 901-903.

Suh et al., "Study of the Field-Screening Effect of Highly Ordered Carbon Nanotube Arrays", Applied Physics Letters, Apr. 1, 2002, vol. 80, No. 13, pp. 2392-2394.

Teo et al., "Field Emission from Dense, Sparse, and Patterned Arrays of Carbon Nanofibers", Applied Physics Letters, Mar. 18, 2002, vol. 80, No. 11, pp. 2011-2013.

Thong et al., "High-Current Field Emission from a Vertically Aligned Carbon Nanotube Field Emitter Array", Applied Physics Letters, Oct. 22, 2001, vol. 79, No. 17, pp. 2811-2813.

Zhang et al., "Formation of Single-Wall Carbon Nanotubes by Laser Ablation of Fullerenes at Low Temperature", Applied Physics Letters, Nov. 15, 1999, vol. 75, No. 20, pp. 3087-3089.

* cited by examiner

CARBON NANOTUBE HIGH-CURRENT-DENSITY FIELD EMITTERS

CROSS-REFERENCE TO RELATED APPLICATION(S)

This application claims priority to U.S. Provisional Patent Application No. 60/575,043 filed May 27, 2004, the disclosure of which is incorporated herein by reference.

STATEMENT REGARDING FEDERALLY SPONSORED RESEARCH

The U.S. Government has certain rights in this invention pursuant to a Code-R grant, awarded by the National Aeronautics and Space Administration, Office of Space Science.

FIELD OF THE INVENTION

The current invention is directed to high-current-density field emitters, and more particularly to high-current-density field emitters based on arrays of carbon nanotube bundles

BACKGROUND OF THE INVENTION

Carbon Nanotubes (CNTs) have many exceptional properties that make them attractive for a variety of applications. In particular, past works have shown that CNTs can have outstanding electrical field emission properties, with high emission currents at low electric field strengths (applied field as low as 1-3 V/μm and emission current as high as 0.1 mA from a single nanotube). Carbon nanotubes are therefore attractive as cold-cathode field emission sources, especially for applications requiring high current densities (hundreds to thousands of amperes per $cm^2$) and lightweight packages (high frequency vacuum tube sources). However, it is also well known that the high emission capability of a single nanotube does not necessarily translate directly into high emission magnitudes from a larger area sample containing many such nanotubes because of the electrostatic screening effect.

A number of different field emitter designs have been proposed including isolated nanotubes and dense, continuous mats of nanotubes. No agreement has been reached on the optimum geometry for producing high current densities in these field emitters. For example, while Nilsson et al have provided simulations showing that the optimum nanotube packing density with best field penetration occurs when the inter-tube spacing is at least twice that of the nanotube height (Nilsson, et al., *Appl. Phys. Lett.* 2000, 76, 2071-2073), Suh et al have performed measurements that appear to shown that it is when the inter-tube spacing is equal to the nanotube height. (Suh, et al., *Appl. Phys. Lett.* 2002, 80, 2392-2394.) More recently, there have been many fundamental works on field emission optimization from CNTs using sparse, dense and patterned arrays of either forests or individual, vertically-aligned nanotubes or nanofibers. (See, e.g., Merkulov, et al., *Appl. Phys. Lett.* 2001, 89, 1933-1937; Chowalla, et al., *Appl. Phys. Lett.* 2001, 79, 2079-2001; Semet, et al. *Appl. Phys. Lett.* 2002, 81, 343-345; Jo, et al., *Appl. Phys. Lett.* 2003, 82, 3520-3522; and Teo, et al., *Appl. Phys. Lett.* 2002, 80, 2011-2013, the disclosure of which are incorporated herein by reference.) But, achieving high current densities (hundreds to thousands of amperes per square centimeter) over large nanotube sample areas with repeatability and emission longevity still remains an open problem. Indeed, despite the intensive research efforts current carbon nanotube field emitter have only reached current densities from CNT of 100-500 $mA/cm^2$ over areas on the order of 100 μm×100 μm. (See, e.g., Thong, et al., *Appl. Phys. Lett.* 2001, 79, 2811-2813; Sohn, et al., *Appl. Phys. Lett.* 2001, 78, 901-903; Rao, et al., S. *Appl. Phys. Lett.* 2000, 76, 3813-3815; and Fan, et al., H. *Science,* 1999, 283, 512-514, the disclosures of which are incorporated herein by reference.)

Accordingly, a need exists for improved carbon nanotube field emitters capable of achieving higher current densities.

SUMMARY OF THE INVENTION

The current invention is directed to a high current density field emitter based on regular arrays of bundled nanofeatures and a method of manufacturing such field emitters.

In one embodiment of the invention the field emitters are capable of producing high emission densities (few amperes per sq. cm) at low electric fields (few V/μm).

In another embodiment of the invention the field emitters are designed to cover an area of at least 100 μm.

In still another embodiment of the invention the bundles of nanofeatures have dimension of a few microns, with the bundles arranged in arrays with an inter-bundle array spacing of several microns. In one such embodiment the bundle dimension is 1 to 2 μm and the inter-bundle spacing is about 5 μm (edge-to-edge).

In yet another embodiment of the invention the field emission characteristics of arrays of such CNT bundles may be controlled by altering the bundle size and separation.

In still yet another embodiment of the invention the field emitters of the current invention are designed to be used as an electron source.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

The present invention is directed to novel high-current-density field emitters based on arrays of nanofeature bundles, and methods of manufacturing such emitter, which are referred to alternatively as "bundle array emitters" herein.

The design of conventional nanofeature field emitters, such as carbon nanotube field emitters is principally concerned with optimizing the ratio between the height and spacing of the nanofeatures. Contrary to this conventional view it has been determined that field emission performance depends strongly on the bundle diameter and inter-bundle spacing, and that arrays of bundles of densely packed nanofeatures, such as multiwalled carbon nanotubes perform significantly better in field emission than the conventional ordered arrays of isolated nanotubes or dense, continuous mats of nanotubes previously investigated.

Figure 1:
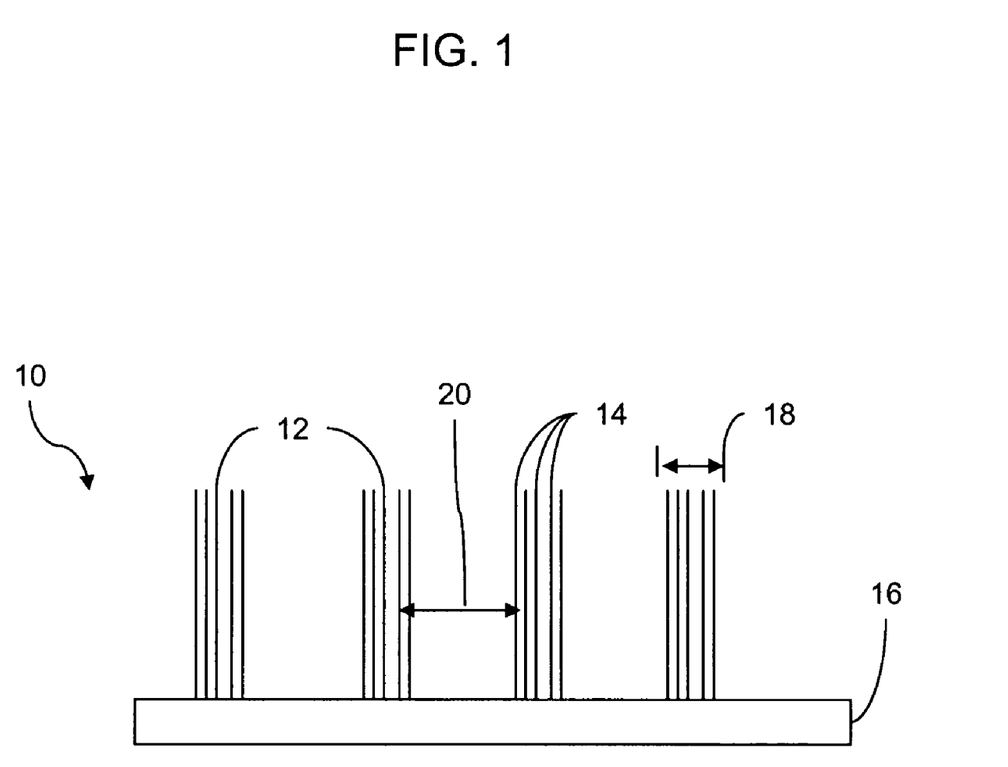
FIG. 1 shows a schematic view of a field emitter geometry in accordance with the current invention.
Figure 2A:
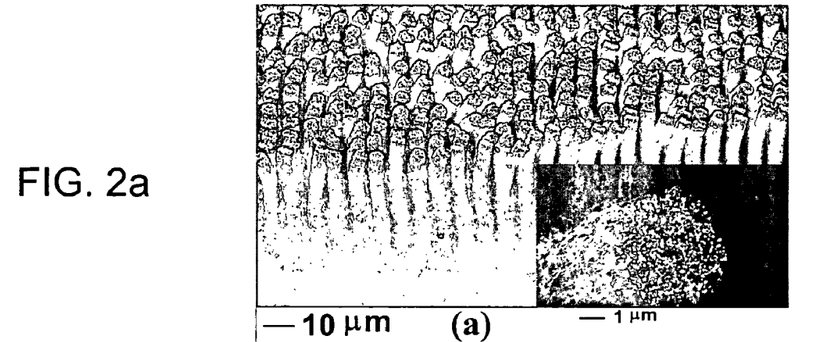
FIGS. 2a to 2d show SEM micrographs of four embodiments of high-density field emitters in accordance with the current invention having different "bundle" edge-to-edge spacings.
Figure 2B:
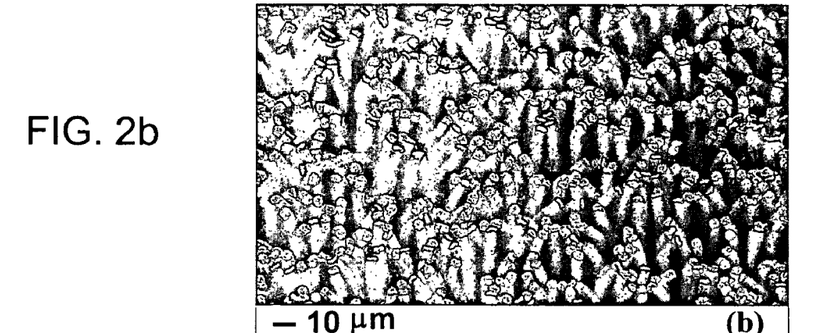
Figure 2C:
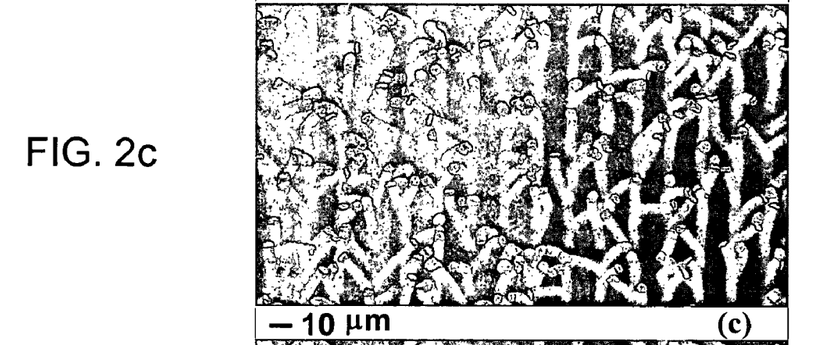
Figure 2D:
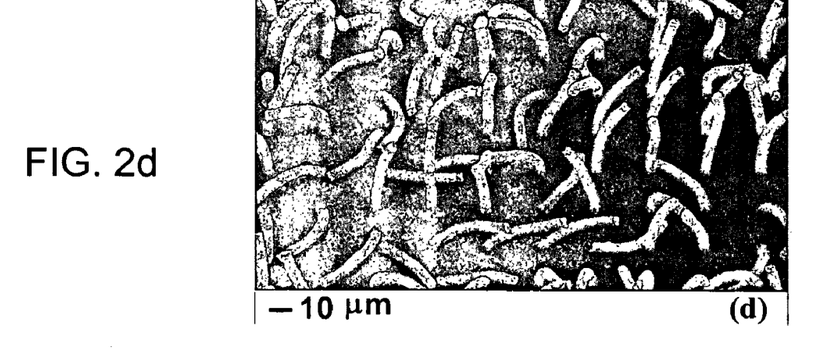
Figure 3A:
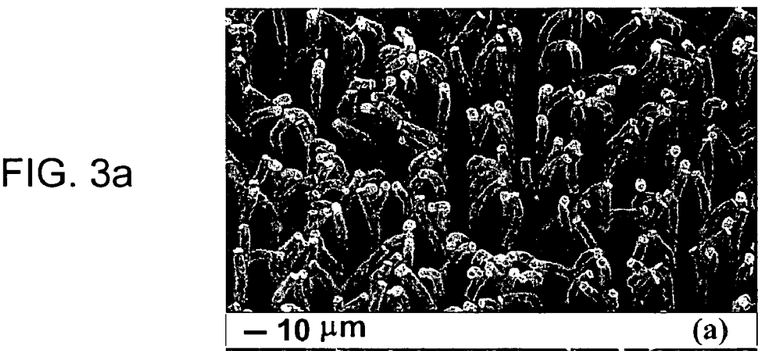
FIGS. 3a to 3d show SEM micrographs of four embodiments of high-density field emitters in accordance with the current invention having different "bundle" diameters.
Figure 3B:
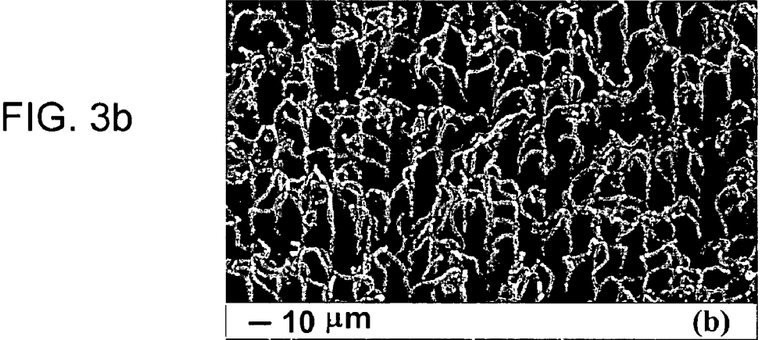
Figure 3C:
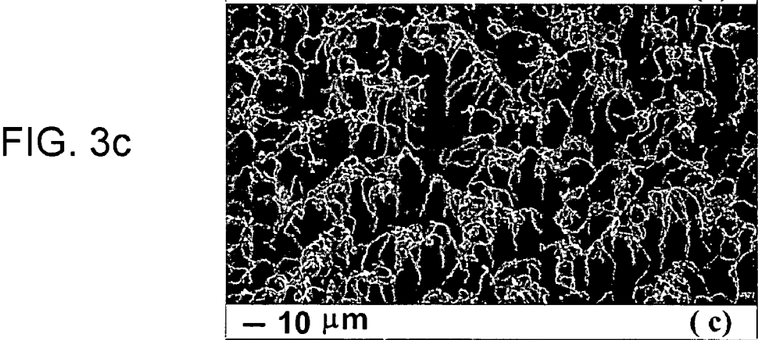
Figure 3D:
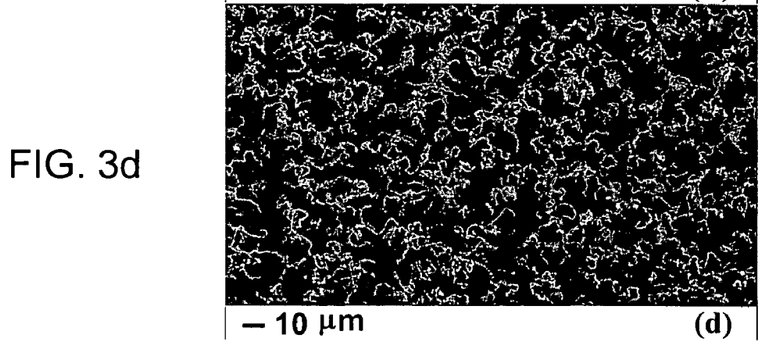

FIG. 1 provides a schematic diagram of the nanofeature geometry of the array of bundles field emission source of the current invention. As shown in FIG. 1, the bundle array field emission source of the current invention 10 is characterized by a plurality of nanofeature bundles 12 each comprised of a plurality of densely packed nanofeatures 14 arrayed on a substrate 16. The key parameters of the invention are the size or dimensions of the bundles, defined by the arrows 18, and the spacing between the bundles, defined by the arrows 20. The current invention recognizes that surprisingly it is not the height to spacing ratio that is critical to the efficient function of nanofeature field emitters, but the ratio of bundle dimension to inter-bundle spacing. As used herein, the bundle dimension defines the spatial cross-section of the individual nanotube bundles and the inter-bundle spacing is equivalent to an array dimension defining the edge-to-edge spacing between each nanotube bundle. If the bundle dimension is made too small or the inter-bundle spacing too large the bundles begin to resemble conventional isolated nanofeature emitters and the current density begins to fall. Likewise, where the bundle dimension becomes very large and the inter-bundle spacing very small the emitter begins to resemble conventional densely packed nanofeature sheet emitters and electrostatic screening between the nanofeatures again begins to reduce emission levels. Accordingly, it is the balance of these values within a bundled array field emitter window that results in the improved performance of the current invention. FIGS. 2 and 3 show exemplary embodiments of field emitters formed from carbon nanotubes in accordance with the bundled array architecture of the current invention, and further demonstrate the optimal window of acceptable architecture for the field emitters of the current invention.

The micrographs shown in FIG. 2 demonstrate the degree of stiffness of CNT bundles as the inter-bundle spacing increases. As shown in FIG. 2, there is a minimum size and spacing for a "patch" of growing CNT below which the nanotubes do not have enough mutual cohesion or restriction of space to form cohesive structures of roughly parallel CNT. In short, the bundles droop significantly as the array spacing increases. The nanotube bundles exhibited sufficient mechanical strength to stand upright in closely spaced arrays (arrays of 2-μm (2a), 5-μm (2b), and 10-μm (2c) edge-to-edge spacings), but drooped in arrays of larger spacings (20 μm (2d) and higher).

The SEM micrographs in FIG. 3, meanwhile demonstrate the role the bundle diameter plays on the degree of stiffness of CNT bundles. As shown, carbon nanotube bundles of various diameters were grown in arrays with 10 μm edge-to-edge bundle spacing. The bundles shown in (a)-(d) are of diameter 5 μm, 2 μm, 1 μm, and 0.5 μm, respectively. FIG. 3 shows another study in which the spacing of the bundles remained constant at 10 μm, but the dimension of the each of the bundles was varied from between 0.5 μm and 5 μm. As shown, for catalyst dots greater than 0.5 μm (3a-c) in size and greater than 2 μm edge-to-edge spacing, the growing nanotubes will stick together and form these cohesive, rope-like structures, whereas the CNT from smaller catalyst dots (3d) do not form bundles, but rather grow individually and tend to form low, bush-like structures. Accordingly, the degree of stiffness depended on the bundle diameter—larger bundles drooped lesser compared to smaller bundles for a given inter-bundle spacing.

In summary, the bundle array field emitters made in accordance with the current methods of the current invention show optimal performance where the bundle size the inter-bundle spacing dimensions are in a ratio of about 1:5 to 2:5. More preferably, bundles of diameter 1 μm and 2 μm are used. In still a more preferred embodiment, square arrays with 5 μm edge-to-edge spacing are used. Using such dimension, over a 100-μm diameter area of field influence, current densities of between about 1.5 to 1.8 A/cm$^2$ at fields as low as 4 V/μm, and >6 A/cm$^2$ at a 20 V/μm field can be produced.

EXAMPLES

The scope of the invention will also be understood with reference to the following, non-limiting examples, which are provided to show the optimum geometry for field emitters in accordance with the current invention.

Figure 4:
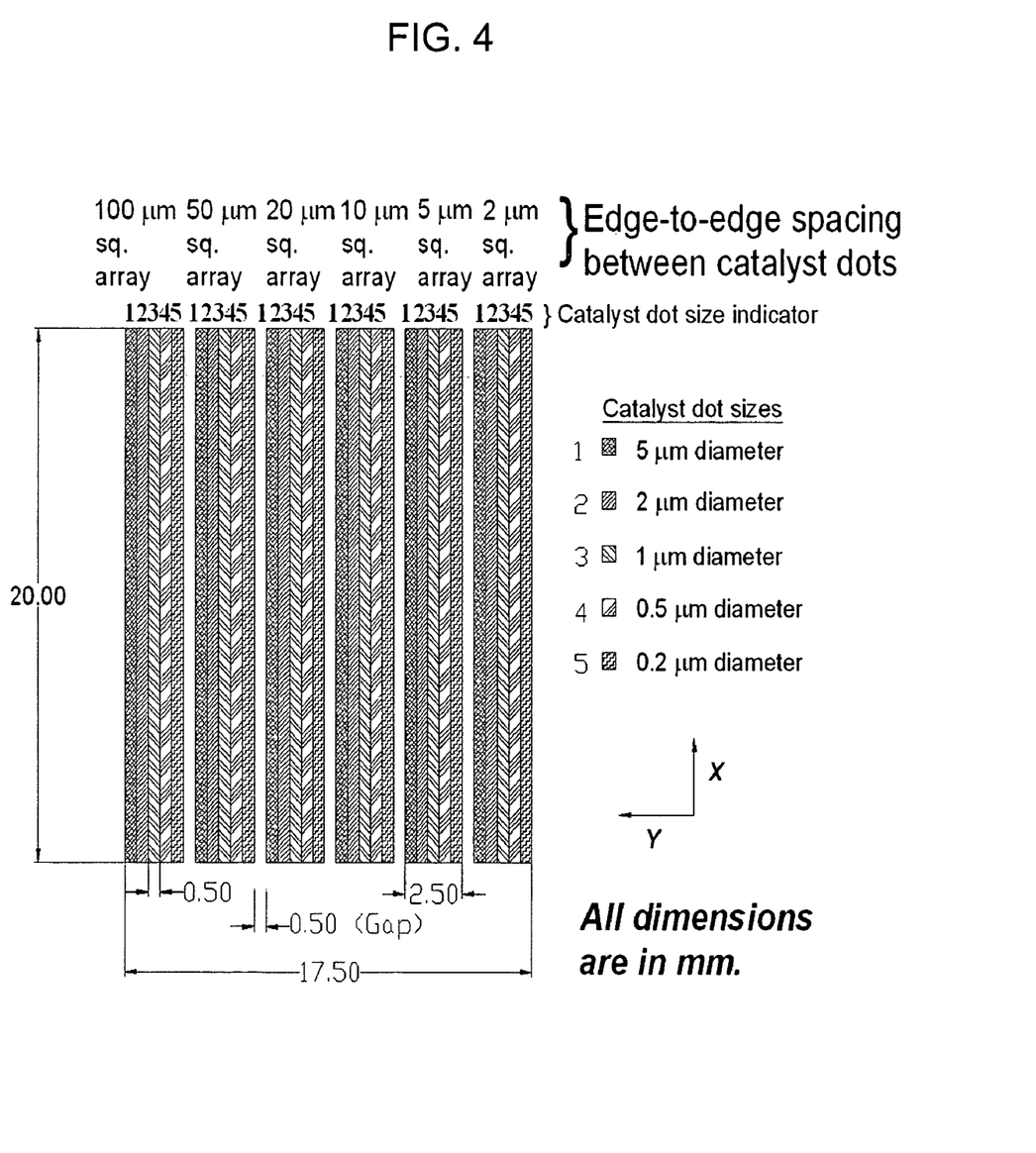
FIG. 4 shows a schematic of an array layout of patterned by e-beam lithography in accordance with the current invention.
Figure 5A:
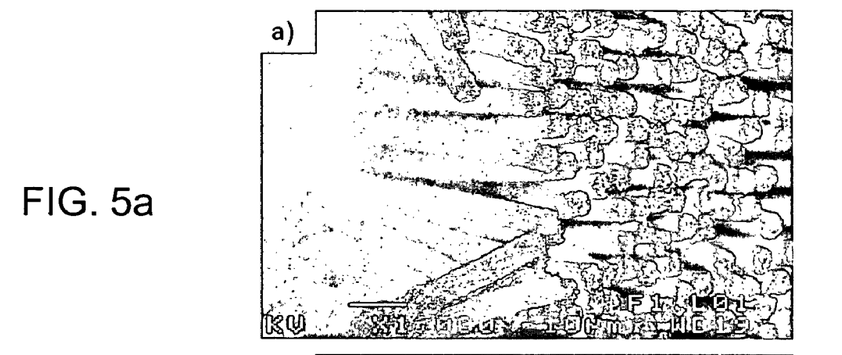
FIGS. 5a to 5d show SEM micrographs of carbon nanotube bundles of various diameter grown in arrays with diameter-separation parameters of 5 μm-2 μm, 5 μm-5 μm, 2 μm-2 μm, and 2 μm-5 μm, respectively.
Figure 5B:
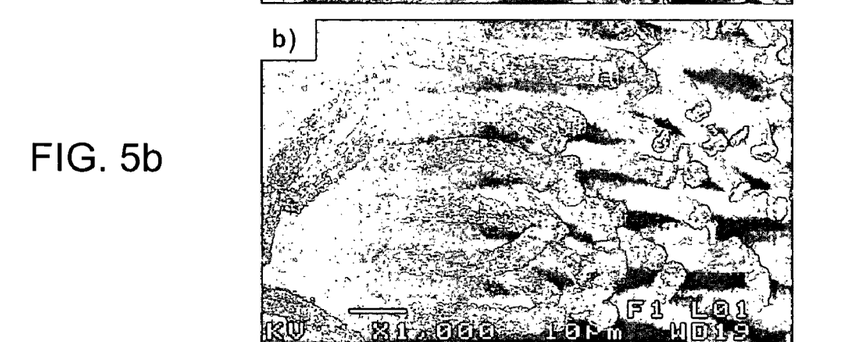
Figure 5C:
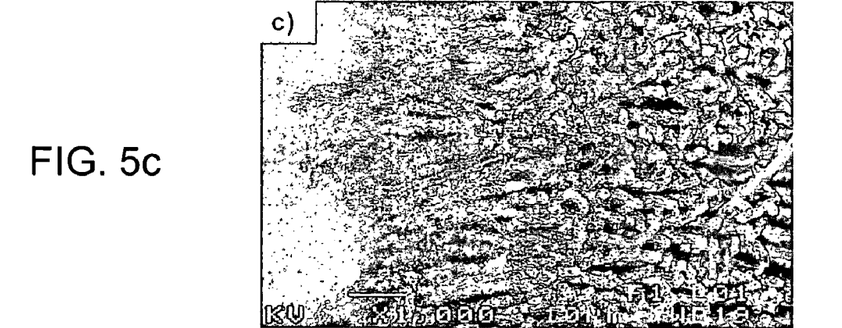
Figure 5D:
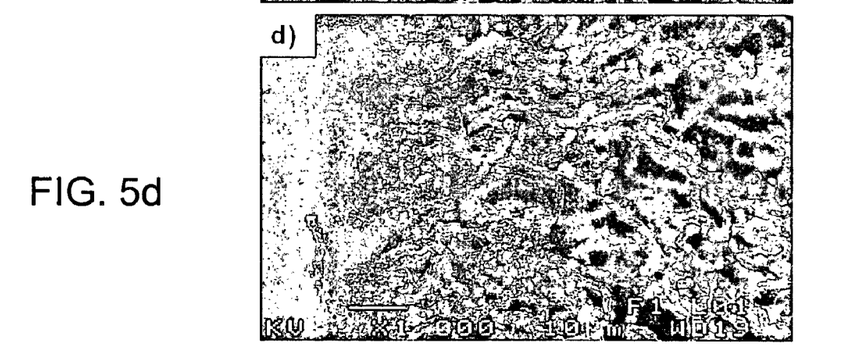

A variety of field emission tests were performed to find the optimal architecture range for the bundle array field emitters of the current invention. It should be understood that these tests and the emitters are only exemplary embodiments and any emitters formed in accordance with the current invention may be used. A schematic diagram of one of the exemplary bundle array patterns that was used for field emission testing is shown in FIG. 4. As shown, dots of catalyst for growing bundles with diameters of 5 μm, 2 μm, 1 μm, 0.5 μm and 0.2 μm were written by lithography in arrays of size 0.5 mm×20 mm. Six such arrays were written for each dot size, with six different edge-to-edge spacing between dots: 100 μm, 50 μm, 20 μm, 10 μm, 5 μm and 2 μm. By scanning a probe anode across these arrays, a comparative field emission behavior from different array combinations could be investigated. SEM micrographs of the surfaces formed in accordance with this patterns are shown in FIG. 5.

The measurements were conducted using a flat-bottomed tungsten probe anode of 100-μm tip diameter. This tip was chosen to keep the area of field emission measurements consistent with the targeted application requirement. The anode was fixed to a XYZ micrometer stage to allow for scanning during measurements. Each array sample was mounted on a flat ceramic block and placed inside a high vacuum chamber. The anode-cathode gap was set to ~15 μm considering an estimated full height of the nanotubes under the effect of the field (At the selected gap, the area of field influence is restricted to that directly beneath the tip. This allows the estimation of the emission current density by approximating the emission area to be the same as the collection area, that is, the tip area of the anode probe). The scan coordinate convention is also shown in FIG. 4. Three lateral scans across the arrays (along Y) were conducted at three different longitudinal locations (in X) separated by at least 1 mm. The vacuum during measurements was typically from 1 to 7×10$^{-5}$ Pa (1 to 5×10$^{-7}$ Torr).

After setting up the anode-cathode bias to the designated field value, the probe was scanned in Y-direction in steps of 50 μm and the field emission values were collected after allowing a brief settling time of 3 to 5 minutes. After completing one scan, the field value was brought to zero, the probe was moved to the starting Y-coordinate and the next X-location, and the scan was restarted as above. A total of three such measurement scans were performed on each sample.

Figure 6:
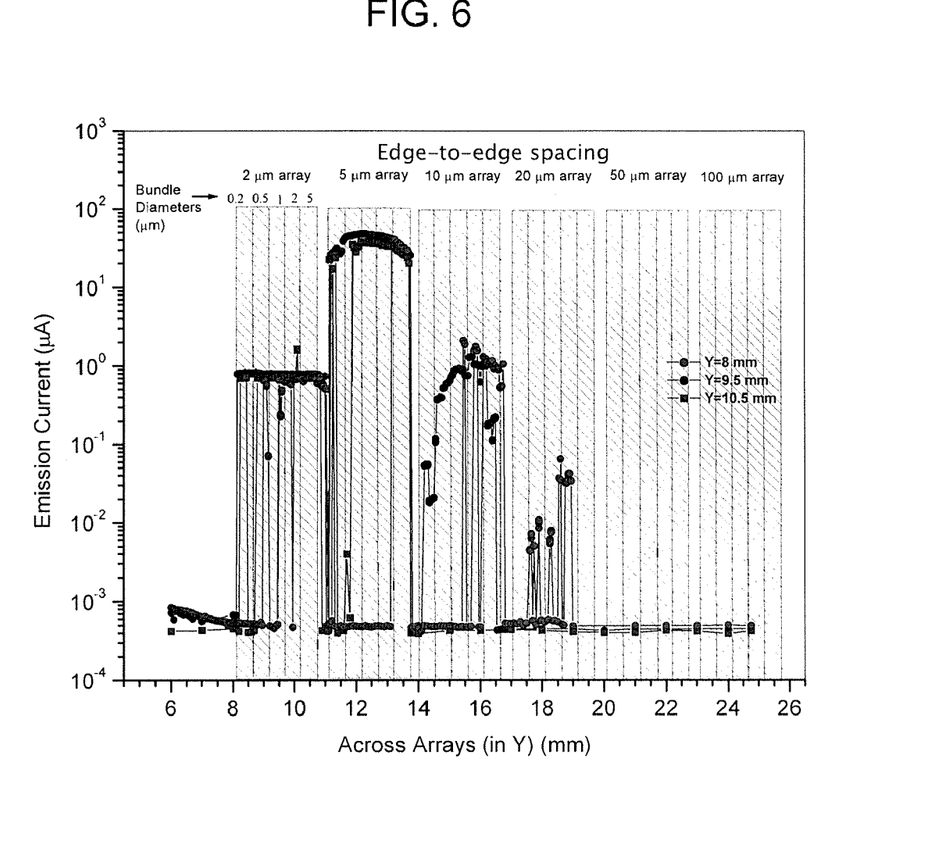
FIG. 6 a graphical depiction of measurements of the field emission current from arrays of nanotube bundles as a function of array spacing and bundle diameter in accordance with the current invention.

The results of field emission current as a function of nanotube bundle diameters and inter-bundle spacing are shown in FIG. 6. The applied field varied from 1.25 to 1.8 V/μm and the measurement field for the data shown was ~3 V/μm. The array layout is shown in the background of the emission curves to help identify the emission magnitude with the corresponding array.

As shown, as the probe was scanned, the emission current remained fairly constant at 0.8-0.9 μA across the 2 μm array, followed by >60× increase in the 5 μm array. The emission decreased as the probe moved from the 5 μm array to the 10 μm array and decreased further by approximately three orders of magnitude in the 20 μm array. Almost no emission was recorded in the 50 μm and 100 μm arrays. The maximum current emission density observed in this scan was >0.6 A/cm$^2$ and this occurred in the 5-μm arrays of 1 μm and 2 μm bundle diameters. The emission behavior was reasonably consistent in the three scans at different X-locations on the sample, as can be seen in FIG. 6.

Similar measurements were conducted with probe anode of diameter 200 μm, with a gap of 50 μm. The field emission pattern in this case was identical to that of 100-μm probe showing higher emission from 2-μm bundles in the 5-μm spaced arrays. In addition, this same pattern of field emission behavior (FIG. 6) was also observed for CNT bundle arrays grown directly on silicon substrates. From these measurements CNT bundles of 1-2 μm diameters with 5-μm edge-to-edge spacing offer an appropriate balance between emitter density and inter-emitter electrostatic shielding, giving rise to enhanced field emission when the area of field influence is ≧100 μm in diameter. Note that the possibility that the observed differences in emission current are due to differences in nanotube length for various bundle sizes and spacings, because observed CNT bundle length was uniform throughout sample areas giving both low and high field emission. This is illustrated in FIG. 5, which shows CNT bundles with four different sets of size-spacing parameters. The CNT length is identical between these four sets of CNT bundles, while the field emission current yield under identical conditions from these sets spans two orders of magnitude (see FIG. 6).

Although not to be bound by theory, the field emission pattern shown in FIG. 6 may be partly explained by the degree of stiffness of the bundles. The anode-cathode gap is set estimating the full height of the bundle under field influence. But, in larger spacing arrays (>20 μm edge-to-edge) because the bundles droop more (trend as shown in FIG. 2) the effective field seen by the bundles is lesser than that seen by the ones standing straight up. As a result, the emission current decreases when the probe scans over these arrays. Also, as mentioned before, the degree of stiffness of the bundles also depends on the bundle diameter—the thicker the bundle, the higher the stiffness (as shown in FIG. 3). Thus, in arrays of spacings 10 μm to 20 μm, the emission current increases as the bundle diameter increases, that is, as the bundles become stiffer (see FIG. 6). However, in 2 μm and 5 μm arrays the inter-bundle spacing is small enough to make all bundles stand straight up making the electric field seen by all of them effectively the same. Under this theory, the number density and the electrostatic screening play a dominant role in determining the emission current and, the emergence of an optimum bundle array architecture.

Figure 7:
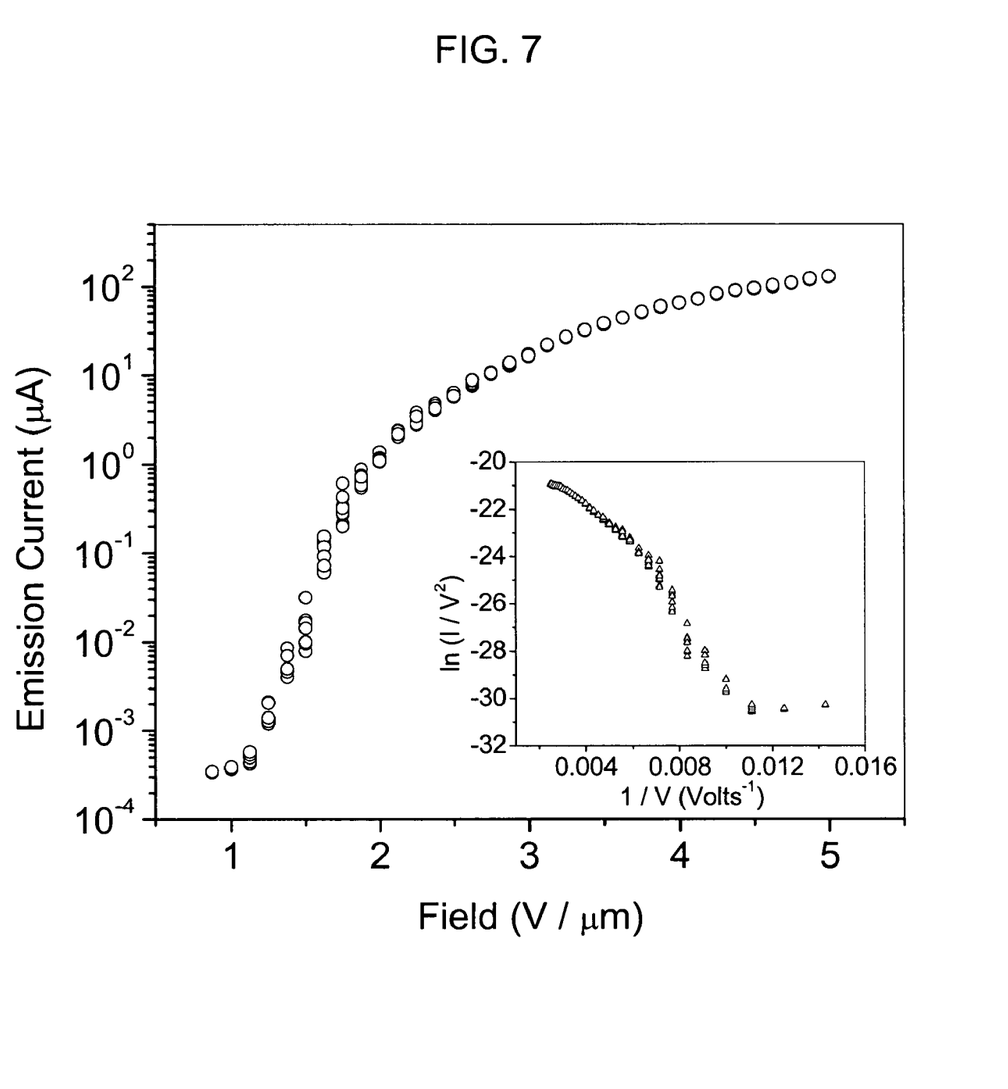
FIG. 7 a graphical depiction of measurements of the field-emission current vs. voltage curve for 2-μm diameter bundle arrays of 5-μm edge-to-edge spacing in accordance with the current invention. The inset shows the corresponding Fowler-Nordeim curve.

Specifically, it appears that an optimum combination of these factors occurs at 1-μm and 2-μm diameter bundles with 5-μm spacing, in that the 2-μm diameter bundles have performed consistently well over different samples and scanning coordinates. By driving these 5 μm-spacing, 1-2 μm-size bundle arrays to higher fields, it is shown that it is possible to routinely achieve 1.5 to 1.8 A/cm$^2$ emission densities at ~4 V/μm and even current densities of >6 A/cm$^2$ at 20 V/μm. These observed current densities at such low fields are much greater than the densities observed using either isolated single CNT (arranged in arrays with similar spacing) or dense mats of CNT grown from continuous Fe catalyst films. Measurements on dense mats of CNT have shown emission in the order of 0.6-4 milliamperes (densities in the range of tens to hundreds of mA/cm$^2$) between 4 to 6 V/μm (Manohara, et al., *SPIE* 5343, 227 (2004), the disclosure of which is incorporated herein by reference), while measurements on random arrays of CNT give current densities of ~0.17 A/cm$^2$ to 1.4 A/cm$^2$ at fields of 6 to 10 V/μm. FIG. 7 shows the field emission curve measured at the 2-μm bundle arrays of 5 μm spacing with the corresponding Fowler-Nordheim (F-N) (Fowler et al., *Proc. R. Soc. London*, Ser. A 119, 173 (1928), the disclosure of which is incorporated herein by reference) curves in the inset. The calculated field enhancement factor was ~4250.

In the discussion above, we confine our analysis to samples with this particular arrangement of CNT bundles, although, three different samples of similar or alternate CNT patterns were prepared and measured, and all gave qualitatively similar behavior of field emission with respect to CNT bundle size and spacing as described in paragraphs above.

Although the above discussion has focused on actual high-density field emitters, the present invention is also directed to a method of manufacture the field emission sources of the current invention. In the exemplary embodiments shown in FIGS. 2 and 3 carbon nanotube ("CNT") nanofeatures were utilized. The CNTs of the current invention may be grown by any suitable methods, but in one exemplary methods they are grown in a tube furnace on catalyst-coated substrates under a flowing mixture of ethylene and hydrogen. Typical CNT growth conditions are: $C_2H_4$ flow, 380 sccm; $H_2$ flow, 190 sccm; total pressure, 200 Torr; Temperature, 650° C.; growth time, 15 minutes.

Although any substrate suitable for growing nanotubes may be used, in the embodiments shown in FIGS. 2 and 3, the substrate consists of silicon wafers with a 400 nm layer of thermal silicon oxide ($SiO_2$). These substrates were patterned with a thin film, approximately 10 nm thick, of sputtered iron catalyst using electron beam lithography and lift-off processing, and then inserted into the tube furnace for CNT growth. Under these conditions, CNT will grow upon the substrates only in the areas patterned with Fe catalyst. Typical CNT length was 50 μm±2 μm, while typical diameter of individual CNT was 10-20 nm.

The iron catalyst may be patterned in arrays of any suitable shape and spacing consisting of circular dots with various diameter (in the range of 0.2-5.0 μm) and separation (in the range of 2-100 μm). These dots may be written in arrays with size ranging from 500 μm to many millimeters. The field emitters shown in FIG. 2 provide examples of CNTs grown from arrays of 5 μm-wide dots of Fe catalyst with various catalyst dot spacing. The inset in FIG. 2(*a*) shows a close-up of one nanotube bundle in which the individual nanotubes are visible.

In summary, the bundle array field emitters made in accordance with the current methods of the current invention the bundles of diameter 1 μm and 2 μm, arranged in square arrays with 5 μm edge-to-edge spacing, produced the maximum emission when tested with ≧100-μm diameter probe anodes. The bundles of 2 μm diameter gave the most consistent results between different scans and different samples. Using this setup, over a 100-μm diameter area of field influence, we have consistently measured 1.5 to 1.8 A/cm$^2$ emission densities at fields as low as 4 V/μm, and >6 A/cm$^2$ has been observed at a 20 V/μm field.

Although only silicon substrates are discussed above, the substrate may be made of any material which can withstand the temperatures required for growth of the nanofeatures and which can be optionally modified to provide a nucleation area for controllably positioning the nanostructure on a specified area of the substrate for integration with a suitable nanomechanical device. Examples of suitable substrates include metallized Si oxide wafers, alumina, or sapphire.

Where required, any suitable catalyzing metal can be used for the nucleation area on the surface of the substrate, such as, for example, nickel or cobalt. Alternatively, the catalyzing metal could be an alloy of two or more metals such as a Co/Ni or Ti/Ni alloy. The metal catalysts could also be produced by pyrolysis of inorganic or organic metal-containing compounds, such as, for example, Ferric Nitrate or Cobalt Chloride. Although not necessary for the current invention such catalyst regions could be controlled to a limit of sub-50 nm catalyst dots, thus it is possible to nucleate growth of a single nanotube at a catalyst location providing more than adequate control for ensuring proper placement of the nanostructure within a larger nanodetector. For nanoscale devices requiring energizing, integrated electrodes can also be produced by combining the catalyst regions with non-catalytic or catalytic electrodes. This ability to precisely locate and orient the growth of the nanostructure and make electrical contact to the nanofeatures provides the basis for fabrication of actuated structures.

Although nanotube nanofeatures are shown in embodiments discussed above, it should be understood that any nanofeature having a field emitter tip capable of being anchored to a surface may be used. For example, in one exemplary embodiment piles of nanoparticles or spheres may be used as the individual nanofeatures in constructing the bundled nanostructures of the current invention. In such an embodiment, nanoparticles such as spheres having all three of their spatial dimensions in the range of 1-100 nm, can be made out of one type of atom (e.g., a metal such as gold) or several types of atoms may be used. Such nanoparticles can have all three spatial dimensions approximately equal (e.g., a sphere or cube), or they can have dimensions that differ by substantial ratios (e.g., a disk or thin rod 1 nm thick and 50 nm long). The nanoparticles or features can have well defined edges or sides, or they can be amorphous and differ substantially, one from another. Regardless of the actual form of the individual nanoparticles or features, in the current invention a plurality of such nanoparticles are collected together to form tall narrow structure such as a cylinder (or bundle) of dimensions comparable to the CNT bundles discussed above. Likewise, these bundles are assembled into an array with size and spacing comparable to those discussed above, such that the resulting cylinder or bundle array has enhanced field emission properties comparable to the CNT bundle arrays previously discussed. These field emission properties could then be manipulated by changing the geometry in which the nanoparticles are brought together to form the bundles, e.g., a small number of "strings" of nanoparticles, stuck together, extending in a one-dimensional fashion above the bulk of the bundle, might provide the actual field emission sites.

Although the field emitters of the current invention contemplate the use of other nanofeatures, such as nanoparticles, in a preferred embodiment, as discussed above, a plurality of carbon nanotubes are utilized. Carbon nanotubes possess a combination of properties that make them well suited for use in the high-density field emitters of the current invention. For example, nanotubes combine a nanometer scale diameter with a large aspect ratio, good electrical conductivity, and elastic bending. The small radius of curvature of the nanotubes induces large Van der Waals forces contributing to the "sticking" capabilities of the individual nanotubes. Single-wall nanotubes also have a Young's modulus of approximately 1 TPa, which corresponds to a strength/weight ratio approaching 200 times that of steel. The combination of this high Young's modulus and the ability to withstand large strains (~5%) suggests that SWNTs should also have very high breaking strengths, allowing for more robust emitters.

Any suitable method may be used for growing the arrays of nanofeatures on a substrate, such as, for example, a chemical vapor deposition (CVD) technique. The basic technique to construct the nanofeature arrays, such as the dense, uses a suitable substrate, such as Si or SOI. To ensure proper growth, the region upon which the nanofeatures are to grow may be coated with a thin catalyst film such as Ni, Co, or other metal-based mixtures or compounds to nucleate nanofeature growth. Regardless of the substrate utilized to form the supports and electrodes, a chemical vapor deposition process (CVD) is utilized to grow the nanotubes from the catalyst patterns. In one embodiment, a high pressure CVD process uses methane, ethylene, or carbon monoxide in pure form or in a mixture with hydrogen (or ammonia) and argon (or nitrogen) to produce nanotubes on a substrate heated to approximately 500-1000° C.

Again, although one method for the self-assembly of carbon nanotubes is described above, it should be understood that in order to incorporate the carbon nanotube field emitters on CMOS electronics, such as might be necessary when integrating the emitters with an electronic display it is necessary to provide carbon nanotube growth at temperatures compatible with processed CMOS circuits, i.e., below about 500° C. Although any suitable method of low temperature growth may be utilized, some exemplary methods include: 1) Murikami et al. (*Appl. Phys. Lett.* 76(13), 1776 (2000)) method for growing carbon nanotube arrays for field emission at <600° C. using bias-enhanced microwave plasma CVD on patterned, nickel-based catalyst at 1-3 Torr; 2) Li et al. (*Appl. Phys. Lett.*, 79(11), 1670 (2001)) method of unaligned nanotube growth on glass at 570° C. using CVD at 100 Torr; 3) low temperature processes for growing carbon nanotubes on silicon (Choi et al., *J. Vac. Sci. Technol. A*, 18(4), 1864 (2000)): using 70 nm nickel films as a catalyst deposited on silicon substrates coated with TiN as an adhesion enhancement layer) and silicon dioxide (Lee et al., *Chem. Phys. Lett.* 327, 277 (2000)) between 500-550° C.; 4) Zhang and Iijima (*Appl. Phys. Lett.*, 75(20), 3087 (1999)) method for growing single-walled carbon nanotubes at 400° C. using laser ablation technique with powdered catalyst containing Ni—Co; and 5) Chen et al. (*J. Cryst. Growth*, 193, 342 (1998)) method of growing graphitic nanofibers on nickel substrates at 350-400° C. All of which are incorporated herein by reference.

While the self-assembled nanostructures contemplated in the embodiments discussed so far have been constructed of dense mats of carbon nanotubes made from pyrolyzing an ethylene feedstock over a substrate, the nanofeatures comprising the nanostructure can be of any shape suitable for field emission applications and made by any process and from any material suitable for making self-assembled structures that are anchored to the substrate, such as, for example, spheres or pyramids made of other atomic materials or even biomolecules, such as, for example, proteins. In another embodiment, the nanofeatures may be further functionalized for a variety of applications, such as, for example, being made hydrophilic or hydrophobic, being charged either negatively or positively, or being derivatized with specific chemical groups, etc. In addition, although only an untreated carbon nanotube nanostructure have been shown thus far, in situ sidewall treatments could alter the electrical properties of the nanotubes, such as by increasing the charge differential induced by a given applied voltage.

Finally, although the above discussion has focused on the construction and structure of the basic nanostructure, it should be understood that a device such as an electron emitter made with the bundle array field emitters according to the invention may also include a body, a self-contained power supply, and any additional machinery or circuitry necessary for the device's operation. For example, the body of the nanomechanical device itself can be made of any material suitable for micromachining utilizing standard lithographic or MEMS techniques to enclose the nanostructure, such as, for example, aluminum oxide or silicon. In a preferred embodiment, the body further comprises a cap layer, which can be of any design, such that the cap layer protects the controlled nanostructure from unwanted contact with the external environment. Such a cap layer could be made of any suitable material, such as, for example, aluminum oxide or silicon. Such a cap layer could be formed by any conventional MEMS process, such as growth or deposition over a sacrificial layer (not shown) deposited to encapsulate the self-assembled nanostructure wherein the sacrificial layer can subsequently be removed to expose the nanostructure itself. Alternatively, these support structures could be formed in a single deposition step with the self-assembled nanostructure. In a more preferred embodiment, one of the substrate, the cap layer, or walls of the nanomechanical device is transparent such that an optical source can be used to interrogate or activate the nanostructure.

In another alternative embodiment, a device having bundle array field emitters in accordance with the current invention may comprise an array of multiple such emitters such that multiple or parallel processing can be carried out at one time. In this embodiment, the emitters can be integrated into a single circuit or detector. It should be understood that while arrays of emitters are discussed above, any suitable alternative geometry of emitters may be utilized. Such an embodiment could be used to develop a mobile emission devices on a chip for mobile emitters. In such an embodiment a portable power source (not shown) would also be integrated into the device.

Further, although the above discussion has been directed to the actual field emitters and methods of forming those field emitters according to the present invention, it should be understood that the invention is also directed to suitable electronic devices comprising the field emitters shown schematically in the above figures. For example, these bundles in optimum array geometry are suitable for applications requiring integration of extraction grid and other beam focusing electrodes because of their free-standing geometry.

Although specific embodiments and exemplary embodiments are disclosed herein, it is expected that persons skilled in the art can and will design alternative field emitters and field emitter combinations and methods to produce the field emitters that are within the scope of the following claims either literally or under the Doctrine of Equivalents.

What is claimed is:

1. A high density field emitter comprising:
a plurality of nanotube bundles disposed on a substrate each of said bundles comprising a plurality of individual nanotubes and being characterized by a nanotube bundle dimension defining the spatial cross-section of the individual nanotube bundles, said bundles being arranged on said substrate in an ordered array characterized by an array dimension defining the edge-to-edge spacing between each said nanotube bundle, wherein the array dimension is about 5.0 µm and a ratio of the bundle dimension to the array dimension ranges from about 0.2:100 to about 5:2.

2. The high density field emitter described in claim 1, wherein the ratio of the nanotube bundle dimension to the array dimension ranges from about 1:5 to about 2:5.

3. The high density field emitter described in claim 1, wherein the nanotube bundle dimension is from about 1.0 µm to about 2.0 µm.

4. The high density field emitter described in claim 1, wherein the array has an area of at least 100 µm$^2$.

5. The high density field emitter described in claim 1, wherein the nanotubes are formed of carbon.

6. The high density field emitter described in claim 1, wherein the nanotubes have a length of about 50 µm and a diameter of about 10 to 20 nm.

7. The high density field emitter described in claim 1, wherein the emitter produces an emission density of at least 1.5 A/cm$^2$ at an applied field of about 4 V/µm.

8. An electron source comprising at least one high density field emitter as described in claim 1.

9. A high density field emitter comprising:
a plurality of nanotube bundles disposed on a substrate each of said bundles comprising a plurality of individual nanotubes and being characterized by a nanotube bundle dimension defining the spatial cross-section of the individual nanotube bundles, said bundles being arranged on said substrate in an ordered array characterized by an array dimension defining the edge-to-edge spacing between each said nanotube bundle, wherein the bundle dimension ranges from about 0.2 to about 5.0 µm and the array dimension is about 5 µm.

* * * * *